United States Patent
Theisinger et al.

(10) Patent No.: US 12,494,684 B2
(45) Date of Patent: Dec. 9, 2025

(54) ROTOR OF AN ELECTRIC MACHINE

(71) Applicant: Robert Bosch GmbH, Stuttgart (DE)

(72) Inventors: Peter Theisinger, Markgroeningen (DE); Adrian Heinrich Sichau, Holzgerlingen (DE); Daniel Klis, Korntal-Muenchingen (DE); Juergen Fridrich, Stuttgart (DE); Kurt Reutlinger, Stuttgart (DE); Marcus Alexander, Ludwigsburg (DE); Mohammad Nassar Albunni, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 18/549,741

(22) PCT Filed: Feb. 25, 2022

(86) PCT No.: PCT/EP2022/054816
§ 371 (c)(1),
(2) Date: Sep. 8, 2023

(87) PCT Pub. No.: WO2022/189170
PCT Pub. Date: Sep. 15, 2022

(65) Prior Publication Data
US 2024/0162769 A1    May 16, 2024

(30) Foreign Application Priority Data
Mar. 11, 2021 (DE) .................. 10 2021 202 360.6

(51) Int. Cl.
*H02K 1/27* (2022.01)
*H02K 1/276* (2022.01)
(52) U.S. Cl.
CPC ............ *H02K 1/2766* (2013.01); *H02K 1/27* (2013.01)

(58) Field of Classification Search
CPC .............................. H02K 1/27; H02K 1/2766
(Continued)

(56) References Cited

U.S. PATENT DOCUMENTS

| 8,957,561 B2 * | 2/2015 | Sano | H02K 1/2766 310/156.56 |
| 11,616,409 B2 * | 3/2023 | Tang | H02K 1/2766 310/156.56 |

(Continued)

FOREIGN PATENT DOCUMENTS

| DE | 102010002786 A1 | 11/2010 |
| DE | 102018215864 A1 | 3/2020 |

(Continued)

OTHER PUBLICATIONS

English Translation of the Written Opinion of the International Search Authority (Year: 2022).*

(Continued)

*Primary Examiner* — Oluseye Iwarere
*Assistant Examiner* — Justin Stefanon
(74) *Attorney, Agent, or Firm* — Michael Best & Friedrich LLP

(57) ABSTRACT

A rotor includes a rotor body. A plurality of the rotor poles have a two-layer magnet assembly. Each magnet assembly includes an inner layer of at least three magnets and an outer layer of two magnets. The inner layer forms a radially outwardly open arc. The magnets of the inner and outer layers each have an angle of inclination with respect to a pole center axis. The angle of inclination is formed between the pole central axis and an inclination axis of the respective magnet. The magnets of the radially outer layer are arranged such that a point of intersection of the axis of inclination of the radially outer layer with the pole center axis lies radially inside the radially inner layer, and the angle of inclination of (Continued)

the magnets of the outer layer is smaller than the angle of inclination of the outer magnets of the inner layer.

18 Claims, 2 Drawing Sheets

(58) Field of Classification Search
USPC ............ 310/156.53, 156.55, 156.56, 156.57, 310/156.83
See application file for complete search history.

(56) References Cited

U.S. PATENT DOCUMENTS

| | | | |
|---|---|---|---|
| 2010/0237735 A1 | 9/2010 | Blissenbach et al. | |
| 2011/0079325 A1* | 4/2011 | Doi .................... | H02K 1/2766 148/108 |
| 2015/0001977 A1* | 1/2015 | Zhang .................. | H02K 21/16 310/154.26 |
| 2016/0248282 A1* | 8/2016 | Jurkovic ................ | H02K 1/02 |
| 2020/0220398 A1* | 7/2020 | Takahashi .............. | H02K 1/276 |
| 2022/0190658 A1* | 6/2022 | Abdelli ................ | H02K 1/2766 |
| 2024/0283310 A1* | 8/2024 | Hirai ........................ | H02K 1/27 |

FOREIGN PATENT DOCUMENTS

| | | | | |
|---|---|---|---|---|
| EP | 3651316 A1 * | 5/2020 | ........... | H02K 1/2766 |
| JP | 2011217602 A | 10/2011 | | |
| JP | 2019187198 A | 10/2019 | | |
| JP | 2020096410 A | 6/2020 | | |
| WO | 2019179863 A1 | 9/2019 | | |
| WO | WO-2019214223 A1 * | 11/2019 | ............... | H02K 1/27 |
| WO | WO-2024175693 A1 * | 8/2024 | ............... | H02K 1/32 |

OTHER PUBLICATIONS

EP3651316A1_Description espacenet.com machine translation (Year: 2020).*

Translation of International Search Report for Application No. PCT/EP2022/054816 dated Jul. 1, 2022 (2 pages).

* cited by examiner

ROTOR OF AN ELECTRIC MACHINE

BACKGROUND

The invention proceeds from a rotor of an electric machine.

A rotor of an electric machine from DE102010002786 A1 is already known, comprising a rotor body which can be rotated about a rotor axis and which, with respect to a cross-section, has a plurality of rotor poles each having a pole center axis, wherein one of the rotor poles has a two-layer magnet assembly comprising a plurality of magnets, in particular permanent magnets, wherein the magnet assembly as viewed in the radial direction with respect to the rotor axis in each case comprises an inner layer of four magnets and an outer layer of two magnets, wherein the inner layer forms a radially outwardly open arc wherein the outer layer is designed in V-shape such that the distance between the magnets of the outer layer increases radially outwards, wherein the magnets of the inner layer, which are outer with respect to the pole center axis, and the magnets of the outer layer in each case have an angle of inclination with respect to the pole center axis, which angle of inclination is enclosed between the pole center axis and an axis of inclination of the respective magnet.

SUMMARY

In contrast, the rotor according to the invention has the advantage that an electric machine equipped with the rotor according to the invention can produce a higher maximum torque as well as has a lower torque ripple and a good field weakening capability. According to the present invention, this is achieved by having the magnets of the radially outer layer arranged such that an intersection of the axis of inclination of the magnets of the radially outer layer with the pole center axis is radially within the radially inner layer and by having the angle of inclination of the magnets of the radially outer layer smaller than the angle of inclination of the outer magnets of the radially inner layer.

According to an advantageous first embodiment example, a single inner magnet can be provided, in relation to a cross-section of the rotor in a plane of one of the laminations, between the outer magnets of the inner layer, which is in particular arranged symmetrically to the pole center axis. In this way, a rotor is achieved at low manufacturing cost. For example, fewer magnets are required compared to the second embodiment example. A single internal magnet is also more inexpensive than two internal magnets according to the second embodiment example.

According to an advantageous second embodiment example, a single inner magnet can be provided, in relation to a cross-section of the rotor in a plane of one of the laminations, between the outer magnets of the inner layer, which are in particular arranged symmetrically to the pole center axis. By this embodiment, a central connecting bar can be formed between the two inner magnets, which connects a radially inner pole segment with a radially outer pole segment of the rotor pole, wherein the magnet assembly is arranged between the outer pole segment and the inner pole segment. In this way, a particularly high mechanical strength of the rotor is achieved.

It is particularly advantageous if, in accordance with the second embodiment example, the inner magnets of the inner layer have an angle of inclination to the pole central axis that is less than 90 degrees. In this way, the inner magnets conform to an arc shape of the inner layer of the magnet assembly. Furthermore, the position of the inner magnets is better adapted to the progression of the magnetic field lines.

It is further advantageous if the height of the inner magnet according to the first embodiment example or the height of the inner magnets according to the second embodiment example is greater than the height of the remaining magnets of the respective magnet assembly. In this way, a good demagnetization strength of the inner magnets as well as a higher flow rate and a higher magnetic flux is achieved by the inner magnets.

Furthermore, it is advantageous if the inner magnet or magnets are made of a material with a lower magnetic coercive field strength and/or with a higher magnetic remanence compared to the remaining magnets of the respective magnet assembly. Higher remanence of the inner magnet(s) can further increase the magnetic flux, thereby increasing the moment of the electric machine. In rare earth magnets, expensive aggregates (for example, dysprosium) can increase coercive field strength at the expense of remanence. However, the internal magnets are less at risk of being demagnetized by opposing fields. Thus, for the internal magnets, a magnetic material with a lower dysprosium content can be used.

It is very advantageous if the outer magnets of the inner layer with respect to the pole center axis and the outer layer magnets are identical in terms of the dimensions and/or the material. In this way, there are two different types of magnets in the rotor that are easy to distinguish due to different dimensions during installation.

It is also advantageous if the outer magnets of the inner layer with respect to the pole center axis and the magnets of the outer layer are arranged symmetrically to the pole center axis. In this way, it is achieved that the rotor poles are symmetrical and the performance of the electric machine is identical in both rotation and torque directions.

Furthermore, is advantageous when the magnets of the inner layer are provided in separate pockets of the rotor body and/or the magnets of the outer layer are provided in separate pockets of the rotor body. In this way, a higher mechanical strength of the rotor body is achieved.

Moreover, it is advantageous if two slot-shaped recesses are arranged radially outside the outer layer as a flux barrier, which have such an angle of inclination to the pole center axis that the distance between the recesses increases radially inward, and which are in particular symmetrical to the pole center axis.

BRIEF DESCRIPTION OF THE DRAWINGS

Two embodiment examples of the invention are shown in simplified form in the drawings and explained in more detail in the following description.

DETAILED DESCRIPTION

Figure 1:
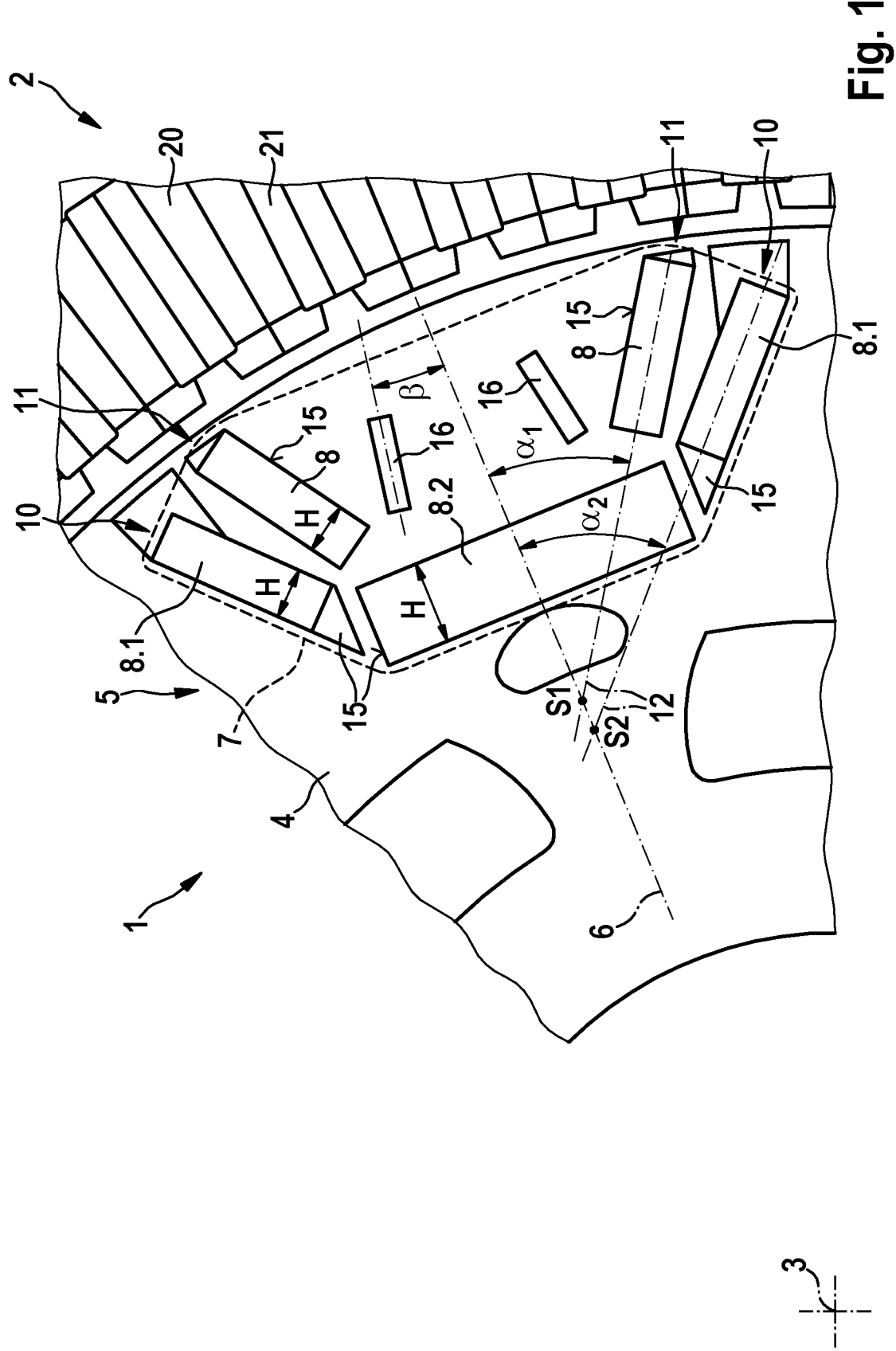
FIG. 1 shows a view of a rotor pole of a rotor according to the present invention according to a first embodiment example.

FIG. 1 shows a view of a rotor pole of a rotor according to the present invention according to a first embodiment example.

The rotor 1 of an electric machine 2 comprises a rotor body 4, which can be rotated about a rotor axis 3 and has a plurality of rotor poles 5 each with a pole center axis 6 in relation to a cross-section of the rotor 1. Of the plurality of rotor poles 5 of the rotor 1, only a single rotor pole 5 is shown in FIG. 1. The rotor body 4 is designed as a so-called lamination, for example, which is formed from a stack of laminations. A plurality of the rotor poles 5, for example all of the rotor poles 5 of the rotor 1, each have a two-layer magnetic assembly 7 comprising a plurality of magnets 8. The magnets 8 are designed as permanent magnets. When viewed radially with respect to the rotor axis 3, the magnet assembly 7 has in each case an inner layer 10 of at least three magnets 8 and an outer layer 11 of two magnets 8.

The inner layer 10 forms an arc opened radially outwards towards an outer circumference 1.1 of the rotor 1. The outer layer 11 is configured such that the distance between the magnets 8 of the outer layer 11 increases radially outward. The magnets 8 of the outer layer 11 are thereby arranged in a V-shape. The outer magnets 8.1 of the inner layer 10 and the magnets 8 of the outer layer 11 with respect to the pole center axis 6 are each arranged with an angle of inclination $\alpha 2$, $\alpha 1$ to the pole center axis 6, which is enclosed between the pole center axis 6 and an axis of inclination 12 of the respective magnet 8. For example, the magnets 8 are cuboid with a rectangular cross-section, wherein the rectangular cross-section has two wide sides and two narrow sides. The magnets 8 have a height H to be measured between the two wide sides.

According to the invention, it is provided that the magnets 8 of the radially outer layer 11 arranged such that an intersection S1 of the axis of inclination 12 of the magnets 8 of the radially outer layer 11 with the pole center axis 6 are radially within the radially inner layer 10 and that the angle of inclination $\alpha 1$ of the magnets 8 of the radially outer layer 11 is smaller than the angle of inclination $\alpha 2$ of the outer magnets 8.1 of the radially inner layer 10. In this way, the magnets 8 of the outer layer 11 are shifted outwards with respect to the pole central axis 6, for example, to such an extent that they each face a narrow side or an edge region of a wide side of an inner magnet 8.2 of the inner layer 10.

Due to the design of the rotor 1 according to the invention, an electric machine 2 equipped with the rotor 1 according to the invention can generate a high torque. In addition, torque ripple is decreased and good field weakening capability is achieved.

According to the first embodiment example shown in FIG. 1, a single inner magnet 8.2 is provided between the outer magnets 8.1 of the inner layer 10, with respect to a cross-section of the rotor 1 in a plane of one of the laminations, which is arranged symmetrically to the pole center axis 6, for example. For example, the height H of the inner magnet 8.2 is greater than the height H of the remaining magnets 8, 8.1 of the respective magnet assembly 7. The inner magnet 8.2 is made of a material are made of a material with a lower magnetic coercive field strength and/or with a higher magnetic remanence compared to the remaining magnets 8, 8.1 of the respective magnet assembly 7.

The outer magnets 8.1 of the inner layer 10 and the magnets 8 of the outer layer 11 with respect to the pole center axis 6 are identical in terms of dimensions and are arranged, for example, symmetrically to the pole center axis 6.

The magnets 8.1, 8.2 of the inner layer 10 are arranged, for example, in separate pockets 15 of the rotor body 4. The magnets 8 of the outer layer 11 are also provided, for example, in separate pockets 15 of the rotor body 4.

Radially outside the outer layer 11 of the respective rotor pole 5, for example, two slot-shaped recesses 16 can be arranged as a flux barrier, which have such an angle of inclination angle $\beta$ to the pole central axis 6, that the distance between the recesses 16 increases radially inwards. In this way, the recesses 16 are provided V-shaped to each other, wherein the V-shape opens radially inwards. In addition, the recesses 16 are arranged, for example, symmetrically to the pole center axis 6.

Figure 2:
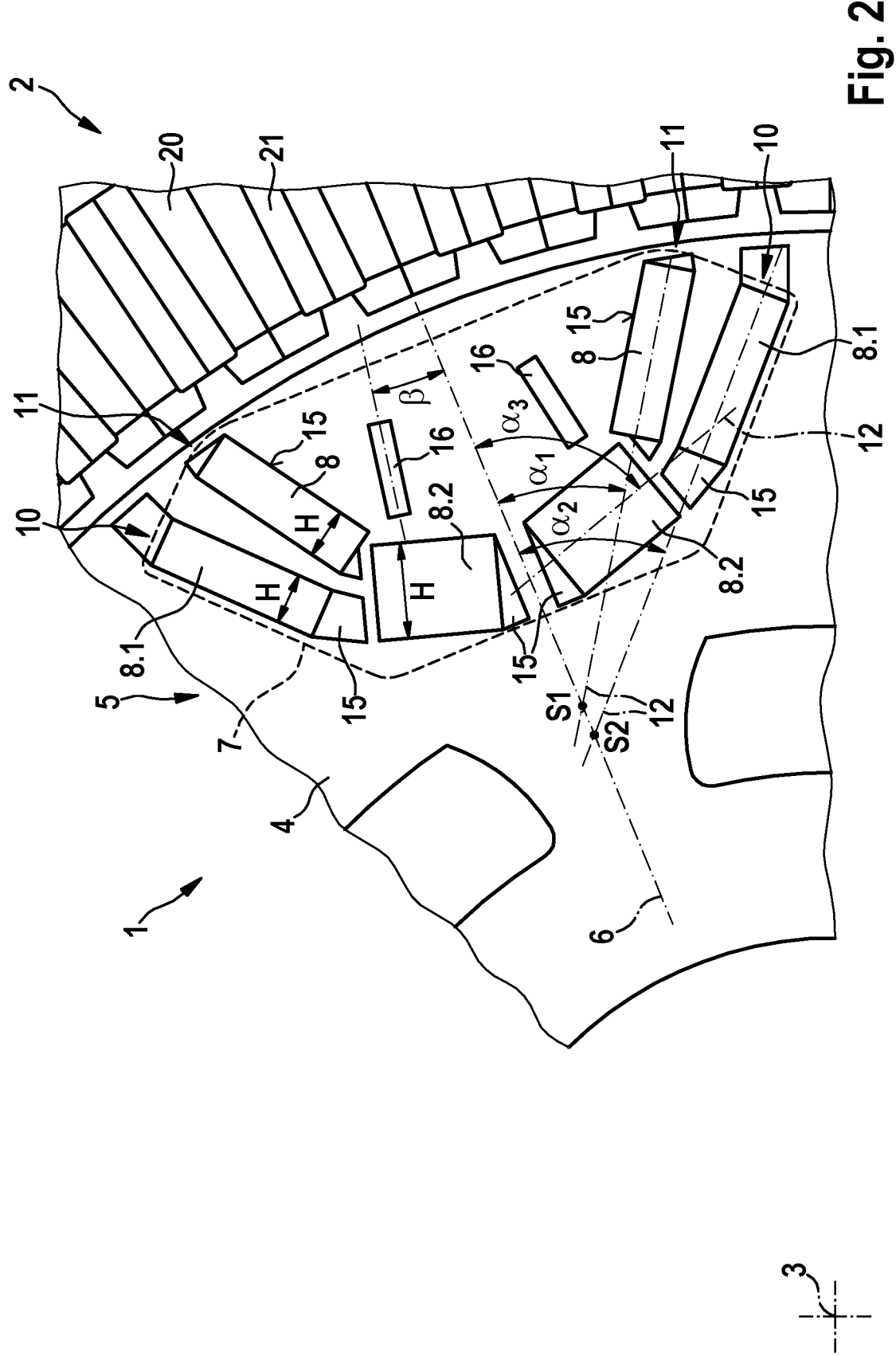
FIG. 2 a view of a rotor pole of a rotor according to the present invention according to a second embodiment example.

FIG. 2a shows a view of a rotor pole of a rotor according to the present invention according to a second embodiment example. In the rotor according to FIG. 2, the parts that are consistent or have the same effect as the rotor according to FIG. 1 are characterized by the same reference numbers.

The second embodiment example differs from the first embodiment example only in that between the outer magnets 8.1 of the inner layer 10, two inner magnets 8.2 are provided instead of a single inner magnet 8.2. The inner magnets 8.2 are arranged, for example, symmetrical to the pole central axis 6.

According to the second embodiment example, the inner magnets 8.2 of the inner layer 10 can have an angle of inclination $\alpha 3$ to the pole central axis 6 that is less than 90 degrees. In addition, the height H of the inner magnet 8.2, for example, is greater than the height H of the remaining magnets 8, 8.1 of the respective magnet assembly 7.

The rotor 1 according to the invention can be used in an electric machine 2 comprising a stator 20 having an electrical stator winding 21. The stator 20 annularly encloses the rotor 1. The rotor 1, with its outer circumference, faces towards an inner circumference of the stator 20.

The invention claimed is:

1. A rotor (1) of an electric machine (2) comprising a rotor body (4) which can be rotated about a rotor axis (3) and which, with respect to a cross-section, has a plurality of rotor poles (5) each having a pole center axis, (6) wherein: a plurality of the rotor poles (5) have a two-layer magnet assembly (7) comprising a plurality of magnets (8), each magnet assembly (7) as viewed in a radial direction with respect to the rotor axis (3), comprises an inner layer (10) having at least three magnets (8) and an outer layer (11) having two magnets (8); the inner layer (10) forms a radially outwardly open arc; the outer layer (11) is configured such that a distance between the magnets (8) of the outer layer (11) increases radially outwards; and the magnets (8.2) of the inner layer (10), which are outer with respect to the pole center axis (6), and the magnets (8) of the outer layer (11) each have an angle of inclination ($\alpha 2$, $\alpha 1$) with respect to the pole center axis (6), which angle of inclination is formed between the pole center axis (6) and an axis of inclination (12) of the magnet in question, wherein the magnets (8) of the radially outer layer (11) are arranged such that a point of intersection (S1) of the axis of inclination (12) of the magnets (8) of the radially outer layer (11) with the pole center axis (6) lies radially inside the radially inner layer (10), and the angle of inclination ($\alpha 1$) of the magnets (8) of the radially outer layer (11) is configured to be smaller than the angle of inclination ($\alpha 2$) of the outer magnets (8.1) of the radially inner layer (10).

2. The rotor according to claim 1, wherein between the outer magnets (8.1) of the inner layer (10), an inner magnet (8.2) is provided.

3. The rotor according to claim 2, wherein the height (H) of the inner magnet (8.2) is greater than the height (H) of the remaining magnets (8,8.1) of the respective magnet assembly (7).

4. The rotor according to claim 2, wherein the inner magnet (8.2) is made of a material with lower magnetic coercive field strength and/or with higher magnetic remanence compared to the remaining magnets (8,8.1) of the respective magnet assembly (7).

5. The rotor according to claim 2, wherein the inner magnet (8.2) is arranged symmetrically to the pole center axis (6).

6. The rotor according to claim 1, wherein between the outer magnets (8.1) of the inner layer (10), two inner magnets (8.2) are provided.

7. The rotor of claim 6, wherein the inner magnets (8.2) of the inner layer (10) have an angle of inclination ($\alpha 3$) to the pole center axis that is less than 90 degrees.

8. The rotor according to claim 6, wherein the two inner magnets (8.2) are arranged symmetrically to the pole center axis (6).

9. The rotor according to claim 6, wherein the height (H) of the inner magnets (8.2) is greater than the height (H) of the remaining magnets (8,8.1) of the respective magnet assembly (7).

10. The rotor according to claim 6, wherein the inner magnets (8.2) are made of a material with lower magnetic coercive field strength and/or with higher magnetic remanence compared to the remaining magnets (8,8.1) of the respective magnet assembly (7).

11. The rotor according to claim 1, wherein the outer magnets (8.1) of the inner layer (10) with respect to the pole center axis (6) and the magnets (8) of the outer layer (11) are identical with respect to the dimensions and/or material.

12. The rotor according to claim 1, wherein the magnets (8.1) of the inner layer (10) which are outer with respect to the pole center axis (6) and the magnets (8) of the outer layer (11) are arranged symmetrically with respect to the pole center axis (6).

13. The rotor according to claim 1, wherein the magnets (8.1,8.2) of the inner layer (10) are provided in separate pockets (15) of the rotor body (4) and/or the magnets (8) of the outer layer (11) are provided in separate pockets (15) of the rotor body (4).

14. The rotor according to claim 1, wherein two slot-shaped recesses (16) are arranged radially outside the outer layer (11) as a flux barrier, which have such an angle of inclination ($\beta$) to the pole center axis (6) that a distance between the recesses (16) increases radially inward.

15. The rotor according to claim 14, wherein the two slot-shaped recesses (16) are symmetrical to the pole center axis (6).

16. An electric machine having a stator (20) comprising a stator winding (21) and having a rotor (1) according to claim 1.

17. The rotor according to claim 1, wherein all of the rotor poles (5) have a two-layer magnet assembly (7).

18. The rotor according to claim 1, wherein the plurality of magnets (8) are permanent magnets.

* * * * *